United States Patent
Ren et al.

(10) Patent No.: US 12,349,085 B2
(45) Date of Patent: Jul. 1, 2025

(54) SIGNAL TRANSMISSION METHOD, SIGNAL RECEPTION METHOD, AND USER EQUIPMENT

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 578 days.

(21) Appl. No.: 17/637,404

(22) PCT Filed: Sep. 17, 2020

(86) PCT No.: PCT/CN2020/115874
§ 371 (c)(1),
(2) Date: Feb. 22, 2022

(87) PCT Pub. No.: WO2021/057589
PCT Pub. Date: Apr. 1, 2021

(65) Prior Publication Data
US 2022/0286985 A1 Sep. 8, 2022

(30) Foreign Application Priority Data
Sep. 26, 2019 (CN) .......................... 201910919201.4

(51) Int. Cl.
*H04W 56/00* (2009.01)
*H04L 5/00* (2006.01)
(52) U.S. Cl.
CPC ......... *H04W 56/001* (2013.01); *H04L 5/0048* (2013.01)

(58) Field of Classification Search
CPC .......................... H04W 56/001; H04L 5/0048
See application file for complete search history.

(56) References Cited

U.S. PATENT DOCUMENTS

| | | | |
|---|---|---|---|
| 2018/0159713 | A1 | 6/2018 | Li et al. |
| 2018/0184391 | A1 | 6/2018 | Ly et al. |

(Continued)

FOREIGN PATENT DOCUMENTS

| | | |
|---|---|---|
| CA | 3062307 A1 | 11/2018 |
| CN | 106507439 A | 3/2017 |

(Continued)

OTHER PUBLICATIONS

Extended European Search Report for European Patent Application 20869605.4 issued on Nov. 25, 2022.

(Continued)

Primary Examiner — Elton Williams
(74) Attorney, Agent, or Firm — Ladas & Parry, LLP

(57) ABSTRACT

The present disclosure provides a signal transmission method, a signal reception method and a UE. The signal transmission method includes transmitting an SSB within a synchronization subframe or slot. The SSB includes a PSS, an SSS and a PBCH. At least one of the following information is configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

18 Claims, 3 Drawing Sheets receiving an SSB within a synchronization subframe or slot, the SSB including a PSS, an SSS and a PBCH, at least one of the following information being configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB

41

(56) References Cited

U.S. PATENT DOCUMENTS

| | | | |
|---|---|---|---|
| 2018/0248642 A1 | 8/2018 | Si et al. | |
| 2018/0248735 A1 | 8/2018 | Zhang et al. | |
| 2018/0302182 A1* | 10/2018 | Ly | H04J 11/0076 |
| 2019/0020517 A1 | 1/2019 | Abedini et al. | |
| 2019/0363809 A1 | 11/2019 | Yoon et al. | |
| 2019/0387488 A1 | 12/2019 | Wang et al. | |
| 2020/0068545 A1 | 2/2020 | Zhang et al. | |
| 2020/0162182 A1 | 5/2020 | Zhang | |
| 2020/0187159 A1 | 6/2020 | Ko et al. | |
| 2021/0235404 A1* | 7/2021 | Li | H04L 27/2666 |
| 2021/0320766 A1 | 10/2021 | Li | |

FOREIGN PATENT DOCUMENTS

| | | | |
|---|---|---|---|
| CN | 106559206 | A | 4/2017 |
| CN | 109076478 | A | 12/2018 |
| CN | 109155728 | A | 1/2019 |
| CN | 109565345 | A | 4/2019 |
| CN | 110115073 | A | 8/2019 |
| CN | 110140392 | A | 8/2019 |
| CN | 110249666 | A | 9/2019 |
| CN | 110574420 | A | 12/2019 |
| EP | 3190732 | A1 | 7/2017 |
| EP | 3425825 | A1 | 1/2019 |
| TW | 201830911 | A | 8/2018 |
| WO | 2018230984 | A1 | 12/2018 |

OTHER PUBLICATIONS

"Feature lead summary on AI 7.2.4.3 Sidelink synchronization mechanism," 3GPP TSG RAN WG1 Meeting #89 R1-1909828, Prague, CZ, Aug. 26-30, 2019, Source: CATT, Agenda Item: 7.2.4.3, all pages.

International Search Report for PCT Application PCT/CN2020/115874 issued on Nov. 27, 2020 and its English Translation provided by WIPO.

Written Opinion for PCT Application PCT/CN2020/115874 issued on Nov. 27, 2020, and its English Translation provided by WIPO.

Internationally Preliminary Report on Patentability for PCT/CN2020/115874 issued on Mar. 15, 2022, and English translation provided by WIPO.

"Sidelink synchronization mechanisms for NR V2X," 3GPP TSG RAN WG1 Meeting #94bis, R1-1810139, Chengdu, China, Oct. 8-12, 2018, Agenda Item: 7.2.4.1.3, Source: Huawei, HiSilicon, all pages.

"Discussion of sidelink synchronization mechanism for NR V2X," 3GPP TSG RAN WG1 #98, R1-1908222, Prague, CZ, Aug. 26-30, 2019, Agenda Item: 7.2.4.3, Source: Fujitsu, all pages.

First Office Action and search report for Chinese Patent Application 201910919201.4 issued on Sep. 13, 2021, and its English translation provided by Global Dossier.

"Status Report to TSG," 3GPP TSG RAN meeting #85, RP-191722, Newport Beach, USA, Sep. 16-20, 2019, Agenda item: 9.4.8, Source: RAN WG1, all pages.

First Office Action and search report for Taiwanese Patent Application 109133452 issued on Mar. 24, 2021, and its English translation provided by Global Dossier.

* cited by examiner

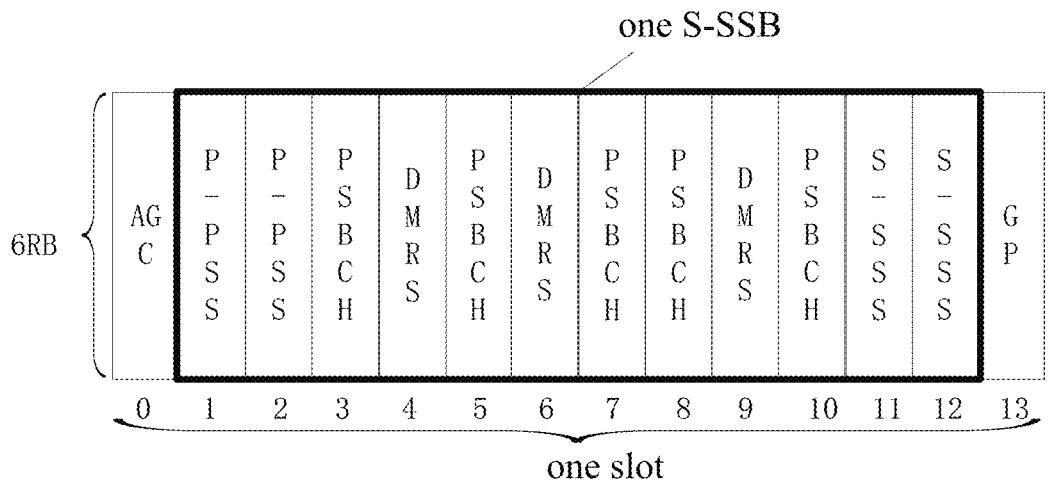

FIG. 1 transmitting an SSB within a synchronization subframe or slot, the SSB including a PSS, an SSS and a PBCH, at least one of the following information being configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB

FIG. 2

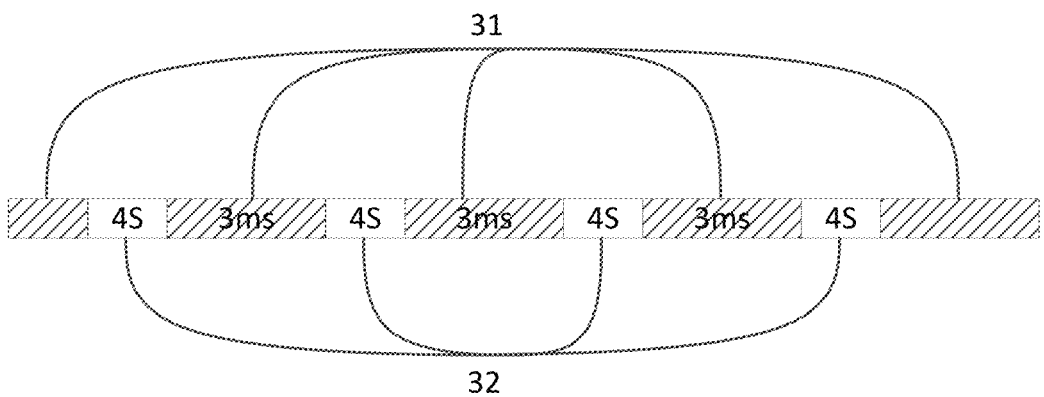

FIG. 3 receiving an SSB within a synchronization subframe or slot, the SSB including a PSS, an SSS and a PBCH, at least one of the following information being configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB — 41

FIG. 4

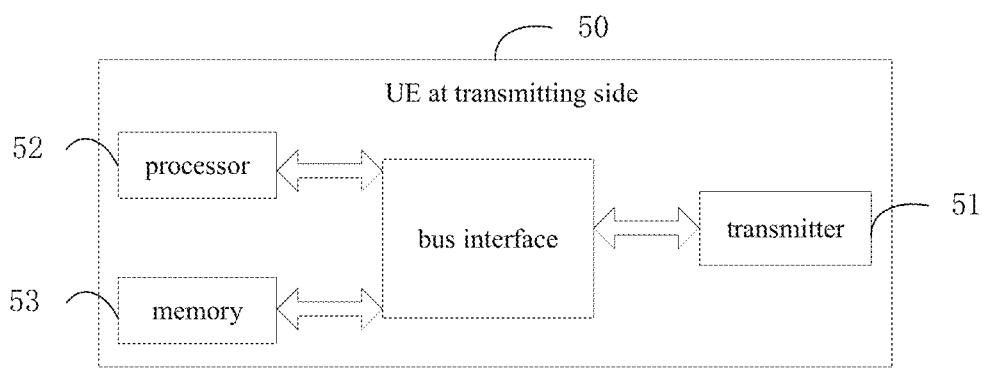

FIG. 5

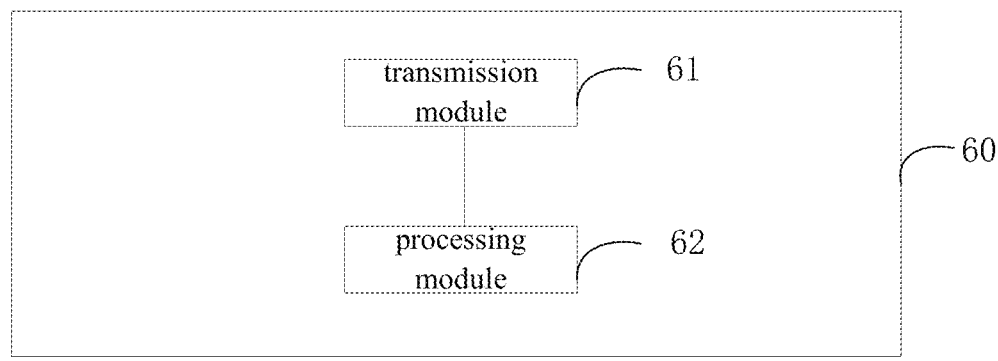

FIG. 6

SIGNAL TRANSMISSION METHOD, SIGNAL RECEPTION METHOD, AND USER EQUIPMENT

CROSS-REFERENCE TO RELATED APPLICATIONS

The present application is the U.S. national phase of PCT Application No. PCT/CN2020/115874 filed on Sep. 17, 2020, which claims a priority of the Chinese patent application 201910919201.4 filed on Sep. 26, 2019, the disclosures of which are incorporated herein by reference in their entireties.

TECHNICAL FIELD

The present disclosure relates to the field of communication technology, in particular to a signal transmission method, a signal reception method, and a User Equipment (UE).

BACKGROUND

In a $5^{th}$-Generation (5G) New Radio (NR) Vehicle-to-Everything (V2X) system, direct communication is performed between User Equipments (UEs) via a PC5 port (Sideline). Before the transmission of service data, at first synchronization needs to be established between the two UEs at the PC5 port (Sidelink). As a method for establishing the synchronization, a UE A transmits a synchronization and broadcasting signal, and a UE B receives the synchronization and broadcasting signal from the UE A. Once the UE B has received and demodulated the synchronization and broadcasting signal successfully, the synchronization is established therebetween for the subsequent direct communication.

A synchronization signal at an NR UU port is carried in a Synchronization Signal Block (SSB). Two SSBs are carried within each slot, and there is no time-domain repetition mechanism for a Primary Synchronization Signal (PSS) and a Secondary Synchronization Signal (SSS).

In order to complete beam measurement and beam selection, beam sweeping needs to be performed on the SSB at the NR UU port. The beam sweeping refers to transmitting, by a base station, the SSB in each possible beam direction within a given time period (5 ms). The UE measures an SSB signal intensity for each beam and reports a measurement result to the base station. The base station selects a most appropriate beam in accordance with the reported measurement result, so as to transmit data to the UE. Depending on different carrier frequencies and different subcarrier spacings, there exist different quantities of direction in which the beam sweeping needs to be performed. Within different carrier frequency ranges, maximum values of SSB beam sweeping candidate directions are 4, 8 and 64 respectively, and the quantity of actually-configured beam sweeping directions shall not exceed the maximum value.

In a relevant Long Term Evolution (LTE) V2X technology (Rel-14/Rel-15 LTE V2X technology), at most three synchronization subframes are configured every 160 ms on the Sidelink, and the UE transmits and receives the Sidelink synchronization signal and broadcasting information within these synchronization subframes. In addition, when the UE transmits and receives the synchronization signal and the broadcasting information within these synchronization subframes, no beam sweeping is performed. The synchronization signal and the broadcasting information each have a relatively small coverage.

Along with the emergence of the 5G NR, an Internet of Vehicles technology has developed further, so as to meet the requirements on new application scenarios. In the LTE V2X technology, the method for transmitting and receiving, by the UE, the synchronization signal and the broadcasting information within the synchronization subframe cannot meet the requirements on the 5G NR new application scenarios.

SUMMARY

An object of the present disclosure is to provide a signal transmission method, a signal reception method and a UE, so as to solve the problem in the related art where it is impossible for the UE to transmit and receive the synchronization signal and the broadcasting information in the case of beam sweeping or beam repetition.

In order to solve the above-mentioned technical problems, the present disclosure provides the following technical solutions.

In one aspect, the present disclosure provides in some embodiments a signal transmission method for a UE, including transmitting an SSB within a synchronization subframe or slot, the SSB including a PSS, an SSS and a Physical Broadcast Channel (PBCH). At least one of the following information is configured through at least one of a preconfigured mode, the PBCH, a Demodulated Reference Signal (DMRS) corresponding to the PBCH and the SSS: information about the quantity of SSBs actually transmitted by the UE within a synchronization period, information about a time-domain position of the SSB, and information about an index number of a currently-transmitted SSB.

In some possible embodiments of the present disclosure, at least one of the information about the quantity of SSBs actually transmitted by the UE within a synchronization period and the information about the time-domain position of the SSB are configured through the preconfigured mode, and the information about the index number of the currently-transmitted SSB is configured through the DMRS corresponding to the PBCH.

In some possible embodiments of the present disclosure, a maximum quantity of SSBs transmitted by the UE within a synchronization period is determined in accordance with a Sub-Carrier Spacing (SCS) of the SSB.

In some possible embodiments of the present disclosure, at least one of the information about the quantity of SSBs actually transmitted by the UE within a synchronization period and the information about the time-domain position of the SSB is indicated through at least two bits, and the SSBs actually transmitted by the UE within a synchronization period are discontinuous or continuous within the configured synchronization subframe or slot.

In some possible embodiments of the present disclosure, the information about the quantity of SSBs actually transmitted by the UE and/or the information about the time-domain position of the SSB are indicated through at least one bit, and the SSBs actually transmitted by the UE within a synchronization period are continuous within the configured synchronization subframe or slot.

In some possible embodiments of the present disclosure, continuous M synchronization subframes or slots are set every N subframes or slots, the SSB is transmitted within the synchronization subframe or slot, and the continuous M synchronization subframes or slots form a group of synchronization resources, where N≥1 and M≥1; or continuous M synchronization subframes or slots are set every N Sidelink available subframes or slots, the SSB is transmitted within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-transmitted SSB is indicated through at least one bit.

In some possible embodiments of the present disclosure, in the case that PBCH channel estimation is performed through the DMRS, at least one of the information about the quantity of SSBs actually transmitted by the UE within a synchronization period, the information about the time-domain position of the SSB and the information about the index number of the currently-transmitted SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually transmitted by the UE within a synchronization period, the information about the time-domain position of the SSB and the information about the index number of the currently-transmitted SSB is carried by a PBCH load.

In some possible embodiments of the present disclosure, the SSB is a Sideline-SSB (S-SSB), the PSS is a Sidelink-PSS (S-PSS), the SSS is a Sidelink-SSS (S-SSS), and the PBCH is a Physical Sidelink Broadcast Channel (PSBCH).

In another aspect, the present disclosure provides in some embodiments a signal reception method for a UE, including receiving an SSB within a synchronization subframe or slot, the SSB including a PSS, an SSS and a PBCH. At least one of the following information is configured through at least one of a preconfigured mode, the PBCH, a DMRS corresponding to the PBCH and the SSS: information about the quantity of SSBs actually received by the UE within a synchronization period, information about a time-domain position of the SSB, and information about an index number of a currently-received SSB.

In some possible embodiments of the present disclosure, at least one of the information about the quantity of SSBs actually received by the UE within a synchronization period and the information about the time-domain position of the SSB are configured through the preconfigured mode, and the information about the index number of the currently-received SSB is configured through the DMRS corresponding to the PBCH.

In some possible embodiments of the present disclosure, a maximum quantity of SSBs received by the UE within a synchronization period is determined in accordance with an SCS of the SSB.

In some possible embodiments of the present disclosure, at least one of the information about the quantity of SSBs actually received by the UE and the information about the time-domain position of the SSB is indicated through at least two bits, and the SSBs actually received by the UE within a synchronization period are discontinuous or continuous within the configured synchronization subframe or slot.

In some possible embodiments of the present disclosure, the information about the quantity of SSBs actually received by the UE and/or the information about the time-domain position of the SSB are indicated through at least one bit, and the SSBs actually received by the UE within a synchronization period are continuous within the configured synchronization subframe or slot.

In some possible embodiments of the present disclosure, continuous M synchronization subframes or slots are set every N subframes or slots, the SSB is received within the synchronization subframe or slot, and the continuous M synchronization subframes or slots form a group of synchronization resources, where N≥1 and M≥1; or continuous M synchronization subframes or slots are set every N Sidelink available subframes or slots, the SSB is received within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-received SSB is indicated through at least one bit.

In some possible embodiments of the present disclosure, in the case that PBCH channel estimation is performed through the DMRS, at least one of the information about the quantity of SSBs actually received by the UE within a synchronization period, the information about the time-domain position of the SSB and the information about the index number of the currently-received SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually received by the UE within a synchronization period, the information about the time-domain position of the SSB and the information about the index number of the currently-received SSB is carried by a PBCH load.

In some possible embodiments of the present disclosure, the SSB is an S-SSB, the PSS is an S-PSS, the SSS is an S-SSS, and the PBCH is a PSBCH.

In yet another aspect, the present disclosure provides in some embodiments a UE, including a processor, a transmitter, a memory, and a program stored in the memory and executed by the processor. The processor is configured to execute the program, so as to transmit an SSB within a synchronization subframe or slot. The SSB includes a PSS, an SSS and a PBCH, and at least one of the following information is configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

In some possible embodiments of the present disclosure, at least one of the information about the quantity of SSBs actually transmitted by the UE within a synchronization period and the information about the time-domain position of the SSB are configured through the preconfigured mode, and the information about the index number of the currently-transmitted SSB is configured through the DMRS corresponding to the PBCH.

In some possible embodiments of the present disclosure, a maximum quantity of SSBs transmitted by the UE within a synchronization period is determined in accordance with an SCS of the SSB.

In some possible embodiments of the present disclosure, at least one of the information about the quantity of SSBs actually transmitted by the UE within a synchronization period and the information about the time-domain position of the SSB is indicated through at least two bits, and the SSBs actually transmitted by the UE within a synchronization period are discontinuous or continuous within the configured synchronization subframe or slot.

In some possible embodiments of the present disclosure, the information about the quantity of SSBs actually transmitted by the UE and/or the information about the time-domain position of the SSB are indicated through at least one bit, and the SSBs actually transmitted by the UE within a synchronization period are continuous within the configured synchronization subframe or slot.

In some possible embodiments of the present disclosure, continuous M synchronization subframes or slots are set every N subframes or slots, the SSB is transmitted within the synchronization subframe or slot, and the continuous M synchronization subframes or slots form a group of synchronization resources, where N≥1 and M≥1; or continuous M synchronization subframes or slots are set every N Sidelink available subframes or slots, the SSB is transmitted within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-transmitted SSB is indicated through at least one bit.

In some possible embodiments of the present disclosure, in the case that PBCH channel estimation is performed through the DMRS, at least one of the information about the quantity of SSBs actually transmitted by the UE within a synchronization period, the information about the time-domain position of the SSB and the information about the index number of the currently-transmitted SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually transmitted by the UE within a synchronization period, the information about the time-domain position of the SSB and the information about the index number of the currently-transmitted SSB is carried by a PBCH load.

In some possible embodiments of the present disclosure, the SSB is an S-SSB, the PSS is an S-PSS, the SSS is an S-SSS, and the PBCH is a PSBCH.

In still yet another aspect, the present disclosure provides in some embodiments a signal transmission device, including a transmission module configured to transmit an SSB within a synchronization subframe or slot, the SSB including a PSS, an SSS and a PBCH. At least one of the following information is configured through at least one of a preconfigured mode, the PBCH, a DMRS corresponding to the PBCH and the SSS: information about the quantity of SSBs actually received by the UE within a synchronization period, information about a time-domain position of the SSB, and information about an index number of a currently-received SSB.

In still yet another aspect, the present disclosure provides in some embodiments a UE, including a processor, a receiver, a memory, and a program stored in the memory and executed by the processor. The processor is configured to execute the program, so as to receive an SSB within a synchronization subframe or slot in the case of beam sweeping or beam repetition, the SSB including a PSS, an SSS and a PBCH. At least one of the following information is carried in at least one of the PBCH, a DMRS corresponding to the PBCH and the SSS: information about the quantity of SSBs actually received by the UE within a synchronization period, information about a time-domain position of the SSB, and information about an index number of a currently-received SSB.

In some possible embodiments of the present disclosure, at least one of the information about the quantity of SSBs actually received by the UE within a synchronization period and the information about the time-domain position of the SSB are configured through the preconfigured mode, and the information about the index number of the currently-received SSB is configured through the DMRS corresponding to the PBCH.

In some possible embodiments of the present disclosure, a maximum quantity of SSBs received by the UE within a synchronization period is determined in accordance with an SCS of the SSB.

In some possible embodiments of the present disclosure, at least one of the information about the quantity of SSBs actually received by the UE and the information about the time-domain position of the SSB is indicated through at least two bits, and the SSBs actually received by the UE within a synchronization period are discontinuous or continuous within the configured synchronization subframe or slot.

In some possible embodiments of the present disclosure, the information about the quantity of SSBs actually received by the UE and/or the information about the time-domain position of the SSB are indicated through at least one bit, and the SSBs actually received by the UE within a synchronization period are continuous within the configured synchronization subframe or slot.

In some possible embodiments of the present disclosure, continuous M synchronization subframes or slots are set every N subframes or slots, the SSB is received within the synchronization subframe or slot, and the continuous M synchronization subframes or slots form a group of synchronization resources, where N≥1 and M≥1; or continuous M synchronization subframes or slots are set every N Sidelink available subframes or slots, the SSB is received within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-received SSB is indicated through at least one bit.

In some possible embodiments of the present disclosure, in the case that PBCH channel estimation is performed through the DMRS, at least one of the information about the quantity of SSBs actually received by the UE within a synchronization period, the information about the time-domain position of the SSB and the information about the index number of the currently-received SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually received by the UE within a synchronization period, the information about the time-domain position of the SSB and the information about the index number of the currently-received SSB is carried by a PBCH load.

In some possible embodiments of the present disclosure, the SSB is an S-SSB, the PSS is an S-PSS, the SSS is an S-SSS, and the PBCH is a PSBCH.

In still yet another aspect, the present disclosure provides in some embodiments a signal reception device, including a reception module configured to receive an SSB within a synchronization subframe or slot, the SSB including a PSS, an SSS and a PBCH. At least one of the following information is configured through at least one of a preconfigured mode, the PBCH, a DMRS corresponding to the PBCH and the SSS: information about the quantity of SSBs actually received by the UE within a synchronization period, information about a time-domain position of the SSB, and information about an index number of a currently-received SSB.

In still yet another aspect, the present disclosure provides in some embodiments a computer-readable storage medium storing therein an instruction. The instruction is executed by a computer so as to implement the above-mentioned method.

The present disclosure has the following beneficial effects.

According to the embodiments of the present disclosure, the SSB is transmitted within the synchronization subframe or slot, and the SSB includes the PSS, the SSS and the PBCH. At least one of the following information is configured through at least one of the preconfigured mode, the PBCH, the DMRS corresponding to the PBCH and the SSS: the information about the quantity of SSBs actually transmitted by the UE within a synchronization period, the information about the time-domain position of the SSB, and the information about the index number of the currently-transmitted SSB. As a result, it is able for the UE to broadcast the information about the quantity of the actually-transmitted SSBs, the time-domain position of the SSB and the information about the index number, thereby to reduce signaling overhead, and enable the UE to complete a synchronization procedure in accordance with the relevant information about the SSB.

BRIEF DESCRIPTION OF THE DRAWINGS

FIG. 1 is a schematic view showing the design of an S-SSB in 5G NR V2X;

FIG. 2 is a flow chart of a signal transmission method according to one embodiment of the present disclosure;

FIG. 3 is a schematic view showing time periods within which service data and an SSB are transmitted according to one embodiment of the present disclosure;

FIG. 4 is a flow chart of a signal reception method according to one embodiment of the present disclosure;

FIG. 5 is a schematic view showing architecture of a UE at a transmission side according to one embodiment of the present disclosure;

FIG. 6 is a schematic view showing modules of a signal transmission device according to one embodiment of the present disclosure;

DETAILED DESCRIPTION

Figure 7:
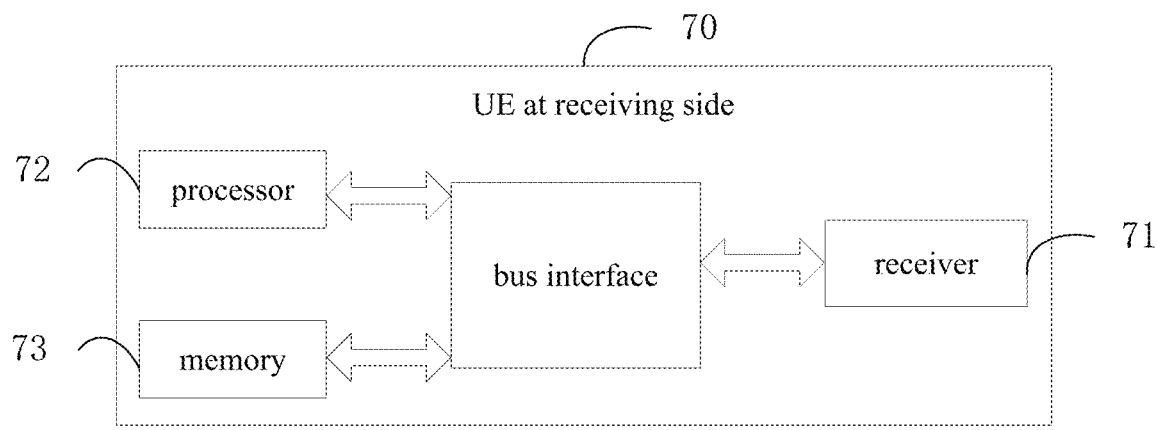
FIG. 7 is a schematic view showing architecture of a UE at a reception side according to one embodiment of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

As shown in FIG. 1, which shows the design of V2X Sidelink synchronization and broadcasting information, prior to the service transmission on the Sidelink, UEs need to be synchronized on the Sidelink. It is necessary to repeat a P-SSS/S-SSS in a time domain, so as to enlarge a coverage of a synchronization signal, thereby to improve detection performance of the synchronization signal.

As shown in FIG. 1, an x-axis represents the time domain, and each column represents one Orthogonal Frequency Division Multiplexing (OFDM) symbol; and a Y-axis represents a frequency domain, i.e., six (6) Resource Blocks (RBs) in FIG. 1. One SSB is transmitted within one slot, and includes an S-PSS, an S-SSS, a Sidelink Physical Broadcast Channel (S-PBCH), and a necessary DMRS.

In NR, contents in the PBCH include system timing information (System Frame Number (SFN) and a half radio frame), frequency-domain information, subCarrierSpacing-Common, ssb-SubcarrierOffset, dmrs-TypeA-Position, pdcch-ConfigSIB1, MSB of the subcarrier offset between SSB and the common resource block grid (FR1)/SSB index (FR2), and cell-related information (cellBarred, and intraFreqReselection).

Some contents in the NR PBCH are not suitable for the V2X, so they are not included in the V2X PSBCH. For example, frequency-domain information pdcch-ConfigSIB1 in the NR PBCH is used to indicate a time/frequency-domain position of an initial BandWidth Part (BWP) and a Physical Downlink Control Channel (PDCCH) monitoring occasion, so this field may be omitted in the V2X PSBCH and it may be used to transmit other information in the V2X.

First Embodiment

As shown in FIG. 2, the present disclosure provides in some embodiments a signal transmission method for a UE, which includes transmitting an SSB within a synchronization subframe or slot. The SSB includes a PSS, an SSS and a PBCH. At least one of the following information is configured through at least one of a preconfigured mode, the PBCH, a Demodulated Reference Signal (DMRS) corresponding to the PBCH and the SSS: information about the quantity of SSBs actually transmitted by the UE within a synchronization period, information about a time-domain position of the SSB, and information about an index number of a currently-transmitted SSB. In some possible embodiments of the present disclosure, at least one of the information about the quantity of SSBs actually transmitted by the UE within a synchronization period and the information about the time-domain position of the SSB are configured through the preconfigured mode, and the information about the index number of the currently-transmitted SSB is configured through the DMRS corresponding to the PBCH.

According to the embodiments of the present disclosure, in the case of beam sweeping or beam repetition, it is able to determine such information as the quantity of SSBs actually transmitted by the UE, the time-domain position of the SSB and the index number of the SSB, and broadcast the information with a relatively small load, thereby to reduce signaling overhead, and enable the UE to complete a synchronization procedure in accordance with the relevant information about the SSB.

Some contents in the NR PBCH are not suitable for the V2X, so they are not included in the V2X PSBCH. For example, frequency-domain information pdcch-ConfigSIB1 in the NR PBCH is used to indicate a time/frequency-domain position of an initial BWP and a PDCCH monitoring occasion, so this field may be omitted in the V2X PSBCH and it may be used to transmit the information about the quantity of SSBs actually transmitted by the UE, the time-domain position of the SSB and the index number of the SSB in the V2X.

Further, a maximum quantity of SSBs transmitted by the UE within a synchronization period is associated with an SCS of the SSB. In other words, the maximum quantity of SSBs transmitted by the UE within a synchronization period is determined using a preconfigured mode in accordance with a Sidelink SCS, as shown in the following table:

| Serial number | SCS Sidelink SCS | Maximum quantity of SSBs transmitted within one period |
|---|---|---|
| 1 | 15 KHz | 1 |
| 2 | 30 KHz | 2 |
| 3 | 60 KHz | 4 |
| 4 | 120 KHz | 4 |

The method in the first embodiment is simple, no air interface or Sidelink signaling is occupied, and an overhead is small.

Second Embodiment

The present disclosure provides in this embodiment a signal transmission method for a UE, which includes transmitting an SSB within a synchronization subframe or slot. The SSB includes a PSS, an SSS and a PBCH. At least one of the following information is configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

At this time, at least one of the information about the quantity of SSBs actually transmitted by the UE within a synchronization period and the information about the time-domain position of the SSB is indicated through at least two bits, and the SSBs actually transmitted by the UE within a synchronization period are discontinuous or continuous within the configured synchronization subframe or slot.

For example, two bits are used to indicate at least one of the information about the quantity of SSBs actually transmitted by the UE within one period and the information about the time-domain position of the SSB. Because there are merely two bits, the transmission positions of at most two SSBs may be indicated. At this time, the SSBs actually transmitted by the UE within one period may be transmitted in a discontinuous manner within the configured synchronization subframe or slot, e.g., the time-domain position of the SSB is mapped through a bitmap.

The synchronization subframe or slot may be configured as follows. Continuous M synchronization subframes or slots are set every N subframes or slots, the SSB is transmitted within the synchronization subframe or slot, and the continuous M synchronization subframes or slots form a group of synchronization resources, where $N \geq 1$ and $M \geq 1$. A spacing between the synchronization subframes or slots is N subframes or slots constantly, and in the case that the quantity of SSBs to be actually transmitted is large, it is able to reduce a service delay of the Sidelink, and reduce complexity in the configuration of the synchronization subframe or slot as well as signaling overhead.

In order to prevent an interference of Sidelink communication (communication between UEs) on normal air-interface communication (communication between a base station and a UE), merely an uplink subframe or slot is available for the Sidelink. The synchronization subframe or slot may also be configured as follows. Continuous M synchronization subframes or slots are set every N Sidelink available subframes or slots, the SSB is transmitted within the synchronization subframe or slot, and the continuous M synchronization subframes or slots form a group of synchronization resources, where $N \geq 1$ and $M \geq 1$.

Here, a value of at least one of N and M is determined in accordance with the SCS of the SSB.

A bitmap mapping method is shown in the following table. In this table, each box represents one synchronization subframe or slot, and the SSB is merely transmitted within the synchronization subframe or slot. X represents that the SSB is not transmitted within the synchronization subframe or slot, and O represents that the SSB is transmitted within the synchronization subframe or slot.

| Values of two bits | The quantity of SSBs to be transmitted and transmission positions | | | | | | | Description |
|---|---|---|---|---|---|---|---|---|
| 01 | slot | synchronization slot(O) | slot | slot | slot | slot | synchronization slot(X) | slot | The quantity of SSBs to be actually transmitted is 1, and a transmission position is a second synchronization subframe or slot |
| 10 | | synchronization slot (X) | slot | slot | slot | slot | synchronization slot (O) | slot | The quantity of SSBs to be actually transmitted is 1, and a transmission position is a first synchronization subframe or slot |

-continued

| Values of two bits | The quantity of SSBs to be transmitted and transmission positions | | | | | | | Description |
|---|---|---|---|---|---|---|---|---|
| 11 | slot synchronization slot (○) | slot | slot | slot | slot | synchronization slot (○) | slot | The quantity of SSBs to be actually transmitted is 2, and a transmission positions are the first and second synchronization subframes or slots |

In the second embodiment, two bits are used to notify the information about the quantity of SSBs actually transmitted within one period and the information about the time-domain position of the SSB, so the signaling overhead is relatively small.

Third Embodiment

The present disclosure provides in this embodiment a signal transmission method for a UE, which includes transmitting an SSB within a synchronization subframe or slot. The SSB includes a PSS, an SSS and a PBCH. At least one of the following information is configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB. In some possible embodiments of the present disclosure, at least one of the information about the quantity of SSBs actually transmitted by the UE within a synchronization period and the information about the time-domain position of the SSB are configured through the preconfigured mode, and the information about the index number of the currently-transmitted SSB is configured through the DMRS corresponding to the PBCH.

At this time, at least one of the information about the quantity of SSBs actually transmitted by the UE within a synchronization period and the information about the time-domain position of the SSB is indicated through at least two bits, and the SSBs actually transmitted by the UE within a synchronization period are discontinuous or continuous within the configured synchronization subframe or slot.

For example, four bits are used to indicate at least one of the information about the quantity of SSBs actually transmitted by the UE within one period and the information about the time-domain position of the SSB. Because there are four bits, the transmission positions of at most four SSBs may be indicated. At this time, the SSBs actually transmitted by the UE within one period may be transmitted in a discontinuous manner within the configured synchronization subframe or slot, e.g., the time-domain position of the SSB is mapped through a bitmap.

The synchronization subframe or slot may be configured as follows. Continuous M synchronization subframes or slots are set every N subframes or slots, the SSB is transmitted within the synchronization subframe or slot, and the continuous M synchronization subframes or slots form a group of synchronization resources, where $N \geq 1$ and $M \geq 1$. A spacing between the synchronization subframes or slots is N subframes or slots constantly, and in the case that the quantity of SSBs to be actually transmitted is large, it is able to reduce a service delay of the Sidelink, and reduce complexity in the configuration of the synchronization subframe or slot as well as signaling overhead.

In order to prevent an interference of Sidelink communication (communication between UEs) on normal air-interface communication (communication between a base station and a UE), merely an uplink subframe or slot is available for the Sidelink. The synchronization subframe or slot may also be configured as follows. Continuous M synchronization subframes or slots are set every N Sidelink available subframes or slots, the SSB is transmitted within the synchronization subframe or slot, and the continuous M synchronization subframes or slots form a group of synchronization resources, where $N \geq 1$ and $M \geq 1$.

Here, a value of at least one of N and M is determined in accordance with the SCS of the SSB.

A bitmap mapping method is shown in the following table. In this table, each box represents one synchronization subframe or slot, and the SSB is merely transmitted within the synchronization subframe or slot. X represents that the SSB is not transmitted within the synchronization subframe or slot, and O represents that the SSB is transmitted within the synchronization subframe or slot.

Note: the following table is merely for illustrative purposes, without listing all possible cases.

| Values of two bits | The quantity of SSBs to be transmitted and transmission positions | | | | | | | Description |
|---|---|---|---|---|---|---|---|---|
| 1000 | slot | synchronization slot (○) | slot | synchronization slot (X) | slot | synchronization slot (X) | slot | synchronization slot (X) | The quantity of SSBs to be actually transmitted is 1, and a transmission position is a first synchronization subframe or slot |

-continued

| Values of two bits | The quantity of SSBs to be transmitted and transmission positions | | | | Description |
|---|---|---|---|---|---|
| 0010 | slot synchronization slot (X) | synchronization slot (X) | synchronization slot (○) | synchronization slot (X) | The quantity of SSBs to be actually transmitted is 1, and a transmission position is a third synchronization subframe or slot |
| 1010 | slot synchronization slot (○) | slot synchronization slot (X) | slot synchronization slot (○) | slot synchronization slot (X) | The quantity of SSBs to be actually transmitted is 2, and a transmission positions are the first and third synchronization subframes or slots |
| 0110 | slot synchronization slot (X) | slot synchronization slot (○) | slot synchronization slot (○) | slot synchronization slot (X) | The quantity of SSBs to be actually transmitted is 2, and transmission positions are second and third synchronization subframes or slots |
| 1101 | slot synchronization slot (○) | slot synchronization slot (○) | slot synchronization slot (X) | slot synchronization slot (○) | The quantity of SSBs to be actually transmitted is 3, and transmission positions are first, second and fourth synchronization subframes or slots |
| 1111 | slot synchronization slot (○) | slot synchronization slot (○) | slot synchronization slot (○) | slot synchronization slot (○) | The quantity of SSBs to be actually transmitted is 4, and transmission positions are first, second, third and fourth synchronization subframes or slots |

In the third embodiment, four bits are used to notify the information about the quantity of SSBs actually transmitted within one period and the information about the time-domain position of the SSB, and the information about four SSBs may be carried.

Fourth Embodiment

The present disclosure provides in this embodiment a signal transmission method for a UE, which includes transmitting an SSB within a synchronization subframe or slot. The SSB includes a PSS, an SSS and a PBCH. At least one of the following information is configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

At this time, at least one of the information about the quantity of SSBs actually transmitted by the UE within a synchronization period and the information about the time-domain position of the SSB is indicated through at least one bit, and the SSBs actually transmitted by the UE within a synchronization period are continuous within the configured synchronization subframe or slot.

For example, one bit is used to indicate at least one of the information about the quantity of SSBs actually transmitted by the UE within one period and the information about the time-domain position of the SSB. At this time, the SSBs actually transmitted by the UE within one period may be transmitted in a continuous manner within the configured synchronization subframe or slot, e.g., 0 represents that one SSB is transmitted, and 1 represents that two SSBs are transmitted continuously.

The synchronization subframe or slot may be configured as follows. Continuous M synchronization subframes or slots are set every N subframes or slots, the SSB is transmitted within the synchronization subframe or slot, and the continuous M synchronization subframes or slots form a group of synchronization resources, where N≥1 and M≥1. A spacing between the synchronization subframes or slots is N subframes or slots constantly, and in the case that the quantity of SSBs to be actually transmitted is large, it is able to reduce a service delay of the Sidelink, and reduce complexity in the configuration of the synchronization subframe or slot as well as signaling overhead.

In order to prevent an interference of Sidelink communication (communication between UEs) on normal air-interface communication (communication between a base station and a UE), merely an uplink subframe or slot is available for the Sidelink. The synchronization subframe or slot may also be configured as follows. Continuous M synchronization subframes or slots are set every N Sidelink available subframes or slots, the SSB is transmitted within the synchronization subframe or slot, and the continuous M synchronization subframes or slots form a group of synchronization resources, where N≥1 and M≥1.

Here, a value of at least one of N and M is determined in accordance with the SCS of the SSB.

A mapping method is shown in the following table. In this table, each box represents one synchronization subframe or slot, and the SSB is merely transmitted within the synchronization subframe or slot. X represents that the SSB is not transmitted within the synchronization subframe or slot, and O represents that the SSB is transmitted within the synchronization subframe or slot.

synchronization subframe or slot, e.g., 00 represents that one SSB is transmitted, and 01 represents that two SSBs are transmitted continuously.

| Value of one bit | The quantity of SSBs to be transmitted and transmission positions | | | | | | | Description |
|---|---|---|---|---|---|---|---|---|
| 0 | slot | synchronization slot (○) | slot | slot | slot | slot | synchronization slot (X) | slot | The quantity of SSBs to be actually transmitted is 1, and a transmission position is a first synchronization subframe or slot |
| 1 | slot | synchronization slot (○) | slot | slot | slot | slot | synchronization slot (○) | slot | The quantity of SSBs to be actually transmitted is 2, and transmission positions are first and second synchronization subframes or slots |

In the fourth embodiment, one bit is used to notify the information about the quantity of SSBs actually transmitted within one period and the information about the time-domain position of the SSB, so the signaling overhead is relatively small.

Fifth Embodiment

The present disclosure provides in this embodiment a signal transmission method for a UE, which includes transmitting an SSB within a synchronization subframe or slot. The SSB includes a PSS, an SSS and a PBCH. At least one of the following information is configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

At this time, at least one of the information about the quantity of SSBs actually transmitted by the UE within a synchronization period and the information about the time-domain position of the SSB is indicated through at least one bit, and the SSBs actually transmitted by the UE within a synchronization period are continuous within the configured synchronization subframe or slot.

For example, two bits are used to indicate at least one of the information about the quantity of SSBs actually transmitted by the UE within one period and the information about the time-domain position of the SSB. At this time, the SSBs actually transmitted by the UE within one period may be transmitted in a continuous manner within the configured The synchronization subframe or slot may be configured as follows. Continuous M synchronization subframes or slots are set every N subframes or slots, the SSB is transmitted within the synchronization subframe or slot, and the continuous M synchronization subframes or slots form a group of synchronization resources, where N≥1 and M≥1. A spacing between the synchronization subframes or slots is N subframes or slots constantly, and in the case that the quantity of SSBs to be actually transmitted is large, it is able to reduce a service delay of the Sidelink, and reduce complexity in the configuration of the synchronization subframe or slot as well as signaling overhead.

In order to prevent an interference of Sidelink communication (communication between UEs) on normal air-interface communication (communication between a base station and a UE), merely an uplink subframe or slot is available for the Sidelink. The synchronization subframe or slot may also be configured as follows. Continuous M synchronization subframes or slots are set every N Sidelink available subframes or slots, the SSB is transmitted within the synchronization subframe or slot, and the continuous M synchronization subframes or slots form a group of synchronization resources, where N≥1 and M≥1.

Here, a value of at least one of N and M is determined in accordance with the SCS of the SSB.

A mapping method is shown in the following table. In this table, each box represents one synchronization subframe or slot, and the SSB is merely transmitted within the synchronization subframe or slot. X represents that the SSB is not transmitted within the synchronization subframe or slot, and O represents that the SSB is transmitted within the synchronization subframe or slot.

| Values of two bits | The quantity of SSBs to be transmitted and transmission positions | | | | | | | | Description |
|---|---|---|---|---|---|---|---|---|---|
| 00 | slot | synchronization slot (○) | slot | synchronization slot (X) | slot | synchronization slot (X) | synchronization slot (X) | | The quantity of SSBs to be actually transmitted is 1, and a transmission position is a first synchronization subframe or slot |
| 01 | slot | synchronization slot (○) | slot | synchronization slot (○) | slot | synchronization slot (X) | synchronization slot (X) | | The quantity of SSBs to be actually transmitted is 2, and transmission positions are first and second synchronization subframes or slots |

| Values of two bits | The quantity of SSBs to be transmitted and transmission positions | | | | | | | | Description |
|---|---|---|---|---|---|---|---|---|---|
| 10 | slot | synchronization slot (O) | slot | synchronization slot (O) | slot | synchronization slot (O) | slot | synchronization slot (X) | The quantity of SSBs to be actually transmitted is 3, and transmission positions are the first, second and third synchronization subframes or slots |
| 11 | slot | synchronization slot (O) | slot | synchronization slot (O) | slot | synchronization slot (O) | slot | synchronization slot (O) | The quantity of SSBs to be actually transmitted is 4, and transmission positions are first, second, third and fourth synchronization subframes or slots |

In the fifth embodiment, two bits are used to notify the information about the quantity of SSBs actually transmitted within one period and the information about the time-domain position of the SSB, so the signaling overhead is relatively small.

Sixth Embodiment

The present disclosure provides in this embodiment a signal transmission method for a UE, which includes transmitting an SSB within a synchronization subframe or slot in the case of beam sweeping or beam repetition. The SSB includes a PSS, an SSS and a PBCH. At least one of the following information is carried in at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

At this time, the information about the index number of the currently-transmitted SSB is indicated through at least one bit.

For example, one bit is used to indicate the information about the index number of the SSB currently transmitted by the UE, where 0 represents that the index number of the currently-transmitted SSB is #0, and 1 represents that the index number of the currently-transmitted SSB is #1.

The following table shows an indication method. In this table, each box represents one synchronization subframe or slot, and the SSB is merely transmitted within the synchronization subframe or slot. O represents that the SSB is transmitted within the synchronization subframe or slot. Two SSBs are transmitted within one period.

In the sixth embodiment, one bit is used to notify the information about the index number of the currently-transmitted SSB, so the signaling overhead is relatively small.

Seventh Embodiment

The present disclosure provides in this embodiment a signal transmission method for a UE, which includes transmitting an SSB within a synchronization subframe or slot in the case of beam sweeping or beam repetition. The SSB includes a PSS, an SSS and a PBCH. At least one of the following information is carried in at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

At this time, the information about the index number of the currently-transmitted SSB is indicated through at least one bit.

For example, two bits are used to indicate the information about the index number of the SSB currently transmitted by the UE, where 00 represents that the index number of the currently-transmitted SSB is #0, and 01 represents that the index number of the currently-transmitted SSB is #1, and so on.

The following table shows an indication method. In this table, each box represents one synchronization subframe or slot, and the SSB is merely transmitted within the synchronization subframe or slot. O represents that the SSB is transmitted within the synchronization subframe or slot. Four SSBs are transmitted within one period.

| Value of one bit | The quantity of SSBs to be transmitted and transmission positions | | | | | | | | Description |
|---|---|---|---|---|---|---|---|---|---|
| 0 | slot | synchronization slot for currently-transmitted SSB (O) | slot | slot | slot | slot | synchronization (O) | slot | slot | A currently-transmitted SSB is a first SSB, i.e., SSB #0. |
| 1 | slot | synchronization slot (O) | slot | slot | slot | slot | synchronization slot for currently-transmitted SSB (O) | slot | slot | A currently-transmitted SSB is a second SSB, i.e., SSB #1. |

| Values of two bits | | The quantity of SSBs to be transmitted and transmission positions | | | | Description |
|---|---|---|---|---|---|---|
| 00 | slot synchronization slot slot for currently-transmitted SSB (○) | synchronization slot slot (○) | synchronization slot slot (○) | synchronization slot slot (○) | | A currently-transmitted SSB is a first SSB, i.e., SSB #0. |
| 01 | slot synchronization slot slot (○) | synchronization slot slot for currently-transmitted SSB (○) | synchronization slot slot (○) | synchronization slot slot (○) | | A currently-transmitted SSB is a second SSB, i.e., SSB #1. |
| 10 | slot synchronization slot slot (○) | synchronization slot slot (○) | synchronization slot slot (○) | synchronization slot slot (○) | | A currently-transmitted SSB is a third SSB, i.e., SSB #2. |
| 11 | slot synchronization slot slot (○) | synchronization slot slot (○) | synchronization slot slot (○) | synchronization slot slot for currently-transmitted SSB (○) | | A currently-transmitted SSB is a fourth SSB, i.e., SSB #3. |

In the seventh embodiment, two bits are used to notify the information about the index number of the currently-transmitted SSB, and the maximum quantity of SSBs capable of being notified is 4.

Eighth Embodiment

The present disclosure provides in this embodiment a signal transmission method for a UE, which includes transmitting an SSB within a synchronization subframe or slot. The SSB includes a PSS, an SSS and a PBCH. At least one of the following information is configured in at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

In the case that PBCH channel estimation is performed through the DMRS, at least one of the information about the quantity of SSBs actually transmitted by the UE within a synchronization period, the information about the time-domain position of the SSB and/or the information about the index number of the currently-transmitted SSB is carried by at least one of a DMRS sequence and/or a PBCH load.

For example, the information about the quantity of SSBs actually transmitted by the UE within one period and the information about the time-domain position of the SSB are carried through four bits, and the information about the index number of the currently-transmitted SSB is carried through two bits, i.e., there are totally six bits. Three-bit information is carried by the DMRS sequence, and the remaining three-bit information is carried by the PBCH load. There are totally eight candidate sequences for the DMRS sequence, and a receiving UE performs blind detection on the DMRS sequence to determine a specific sequence of the eight candidate sequences used by a transmitting UE, so as to obtain the three-bit information.

According to the method in the eighth embodiment of the present disclosure, the information about the SSB is carried by the DMRS sequence and the PBCH load together, so it is able to reduce the signaling overhead.

Ninth Embodiment

The present disclosure provides in the ninth embodiment a signal transmission method for a UE, which includes transmitting an SSB within a synchronization subframe or slot. The SSB includes a PSS, an SSS and a PBCH. At least one of the following information is configured in at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB.

In the case that the PBCH channel estimation is performed merely through the SSS and there is no DMRS, at least one of the information about the quantity of SSBs actually transmitted by the UE within a synchronization period, the information about the time-domain position of the SSB and the information about the index number of the currently-transmitted SSB is carried by a PBCH load.

For example, the information about the quantity of SSBs actually transmitted by the UE within one period and the information about the time-domain position of the SSB are carried through four bits, and the information about the index number of the currently-transmitted SSB is carried through two bits, i.e., there are totally six bits. All pieces of the information are carried by the PBCH load.

According to the ninth embodiment of the present disclosure, the information about the SSB is carried merely by the PBCH load, and no DMRS is mapped, so it is able to reduce a code rate of the PBCH and improve demodulation performance of the PBCH.

Tenth Embodiment

In the above-mentioned second, third, fourth and fifth embodiments of the present disclosure, continuous M (M≥1) synchronization subframes or slots are set every N (N≥1) subframes or slots, the SSB is transmitted merely within the synchronization subframe or slot, and the continuous M synchronization subframes or slots form a group of synchronization resources. A spacing between the synchronization resources in each group is N subframes or slots constantly.

For example, as shown in FIG. 3, for a 60 KHz SCS, each subframe (1 ms) includes four slots (each slot occupies 0.25 ms). When the quantity of actually-transmitted SSBs is 16, one group of SSBs include four SSBs and each SSB occupies one slot, i.e., there are totally four groups. When one group of SSBs are transmitted every 12 slots, i.e., every 3 seconds, service data may be transmitted within a slot where no SSB is transmitted, so it is able to reduce a service delay. In FIG. 3, each time period 31 is used to transmit the service data, each time period 32 is used to transmit the SSB, and 4S represents that four (4) SSBs are transmitted within 1 ms. Based on this configuration, in the case that the quantity of SSBs to be actually transmitted is large, it is able to reduce the Sidelink service delay, and reduce the complexity in the configuration of the synchronization subframe or slot as well as the signaling overhead.

In the above-mentioned embodiments of the present disclosure, the SSB is an S-SSB, the PSS is an S-PSS, the SSS is an S-SSS, and the PBCH is a PSBCH.

According to the embodiments of the present disclosure, in the case of beam sweeping or beam repetition, the UE may determine the information about the quantity of SSBs actually transmitted by the UE, the information about the time-domain position of the SSB and the information about the index number of the SSB in accordance with a method used by the UE for performing the PBCH channel estimation, so it is able to broadcast the information with a relatively small PBCH load, thereby to reduce the signaling overhead, and enable the UE to complete a synchronization procedure in accordance with the relevant information about the SSB.

As shown in FIG. 4, the present disclosure further provides in some embodiments a signal reception method for a UE, which includes Step 41 of receiving an SSB within a synchronization subframe or slot, the SSB including a PSS, an SSS and a PBCH. At least one of the following information is configured through at least one of a preconfigured mode, the PBCH, a DMRS corresponding to the PBCH and the SSS: information about the quantity of SSBs actually received by the UE within a synchronization period, information about a time-domain position of the SSB, and information about an index number of a currently-received SSB. In some possible embodiments of the present disclosure, at least one of the information about the quantity of SSBs actually received by the UE within a synchronization period and the information about the time-domain position of the SSB are configured through the preconfigured mode, and the information about the index number of the currently-received SSB is configured through the DMRS corresponding to the PBCH.

In some possible embodiments of the present disclosure, a maximum quantity of SSBs received by the UE within a synchronization period is determined in accordance with an SCS of the SSB.

In some possible embodiments of the present disclosure, at least one of the information about the quantity of SSBs actually received by the UE and the information about the time-domain position of the SSB is indicated through at least two bits, and the SSBs actually received by the UE within a synchronization period are discontinuous or continuous within the configured synchronization subframe or slot.

In some possible embodiments of the present disclosure, the information about the quantity of SSBs actually received by the UE and/or the information about the time-domain position of the SSB are indicated through at least one bit, and the SSBs actually received by the UE within a synchronization period are continuous within the configured synchronization subframe or slot.

In some possible embodiments of the present disclosure, continuous M synchronization subframes or slots are set every N subframes or slots, the SSB is received within the synchronization subframe or slot, and the continuous M synchronization subframes or slots form a group of synchronization resources, where N≥1 and M≥1; or continuous M synchronization subframes or slots are set every N Sidelink available subframes or slots, the SSB is received within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-received SSB is indicated through at least one bit.

In some possible embodiments of the present disclosure, in the case that PBCH channel estimation is performed through the DMRS, at least one of the information about the quantity of SSBs actually received by the UE within a synchronization period, the information about the time-domain position of the SSB and the information about the index number of the currently-received SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually received by the UE within a synchronization period, the information about the time-domain position of the SSB and the information about the index number of the currently-received SSB is carried by a PBCH load.

In some possible embodiments of the present disclosure, the SSB is an S-SSB, the PSS is an S-PSS, the SSS is an S-SSS, and the PBCH is a PSBCH.

It should be appreciated that, the specific implementation modes in the above-mentioned second to tenth embodiments may also be applied to the embodiments involving the UE with a same technical effect.

As shown in FIG. 5, the present disclosure further provides in some embodiments a UE 50, which includes a processor 52, a transmitter 51, a memory 53, and a program stored in the memory 53 and executed by the processor 52. The processor 52 is configured to execute the program, so as to transmit an SSB within a synchronization subframe or slot. The SSB includes a PSS, an SSS and a PBCH, and at least one of the following information is configured through at least one of a preconfigured mode, the PBCH, a DMRS corresponding to the PBCH and the SSS: information about the quantity of SSBs actually transmitted by the UE within a synchronization period, information about a time-domain position of the SSB, and information about an index number of a currently-transmitted SSB. In some possible embodiments of the present disclosure, at least one of the information about the quantity of SSBs actually transmitted by the UE within a synchronization period and the information about the time-domain position of the SSB are configured through the preconfigured mode, and the information about the index number of the currently-transmitted SSB is configured through the DMRS corresponding to the PBCH.

In some possible embodiments of the present disclosure, a maximum quantity of SSBs transmitted by the UE within a synchronization period is determined in accordance with an SCS of the SSB.

In some possible embodiments of the present disclosure, at least one of the information about the quantity of SSBs actually transmitted by the UE within a synchronization period and the information about the time-domain position of the SSB is indicated through at least two bits, and the SSBs actually transmitted by the UE within a synchronization period are discontinuous or continuous within the configured synchronization subframe or slot.

In some possible embodiments of the present disclosure, the information about the quantity of SSBs actually transmitted by the UE and/or the information about the time-domain position of the SSB are indicated through at least one bit, and the SSBs actually transmitted by the UE within a synchronization period are continuous within the configured synchronization subframe or slot.

In some possible embodiments of the present disclosure, continuous M synchronization subframes or slots are set every N subframes or slots, the SSB is transmitted within the synchronization subframe or slot, and the continuous M synchronization subframes or slots form a group of synchronization resources, where N≥1 and M≥1; or continuous M synchronization subframes or slots are set every N Sidelink available subframes or slots, the SSB is transmitted within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-transmitted SSB is indicated through at least one bit.

In some possible embodiments of the present disclosure, in the case that PBCH channel estimation is performed through the DMRS, at least one of the information about the quantity of SSBs actually transmitted by the UE within a synchronization period, the information about the time-domain position of the SSB and the information about the index number of the currently-transmitted SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually transmitted by the UE within a synchronization period, the information about the time-domain position of the SSB and the information about the index number of the currently-transmitted SSB is carried by a PBCH load.

In some possible embodiments of the present disclosure, the SSB is an S-SSB, the PSS is an S-PSS, the SSS is an S-SSS, and the PBCH is a PSBCH.

It should be appreciated that, the specific implementation modes in the above-mentioned second to tenth embodiments may also be applied to the embodiments involving the UE with a same technical effect. In the UE, the transmitter 51 may be in communication with the memory 53 and the processor 52 via a bus interface, a function of the processor 52 may also be achieved by the transmitter 51, and a function of the transmitter 51 may also be achieved by the processor 52.

As shown in FIG. 6, the present disclosure further provides in some embodiments a signal transmission device 60, which includes a transmission module 61 configured to transmit an SSB within a synchronization subframe or slot, the SSB including a PSS, an SSS and a PBCH. At least one of the following information is configured through at least one of a preconfigured mode, the PBCH, a DMRS corresponding to the PBCH and the SSS: information about the quantity of SSBs actually received by the UE within a synchronization period, information about a time-domain position of the SSB, and information about an index number of a currently-received SSB. In some possible embodiments of the present disclosure, at least one of the information about the quantity of SSBs actually transmitted by the UE within a synchronization period and the information about the time-domain position of the SSB are configured through the preconfigured mode, and the information about the index number of the currently-transmitted SSB is configured through the DMRS corresponding to the PBCH.

In some possible embodiments of the present disclosure, a maximum quantity of SSBs transmitted by the UE within a synchronization period is determined in accordance with an SCS of the SSB.

In some possible embodiments of the present disclosure, at least one of the information about the quantity of SSBs actually transmitted by the UE within a synchronization period and the information about the time-domain position of the SSB is indicated through at least two bits, and the SSBs actually transmitted by the UE within a synchronization period are discontinuous or continuous within the configured synchronization subframe or slot.

In some possible embodiments of the present disclosure, the information about the quantity of SSBs actually transmitted by the UE and/or the information about the time-domain position of the SSB are indicated through at least one bit, and the SSBs actually transmitted by the UE within a synchronization period are continuous within the configured synchronization subframe or slot.

In some possible embodiments of the present disclosure, continuous M synchronization subframes or slots are set every N subframes or slots, the SSB is transmitted within the synchronization subframe or slot, and the continuous M synchronization subframes or slots form a group of synchronization resources, where N≥1 and M≥1; or continuous M synchronization subframes or slots are set every N Sidelink available subframes or slots, the SSB is transmitted within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-transmitted SSB is indicated through at least one bit.

In some possible embodiments of the present disclosure, in the case that PBCH channel estimation is performed through the DMRS, at least one of the information about the quantity of SSBs actually transmitted by the UE within a synchronization period, the information about the time-domain position of the SSB and the information about the index number of the currently-transmitted SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually transmitted by the UE within a synchronization period, the information about the time-domain position of the SSB and the information about the index number of the currently-transmitted SSB is carried by a PBCH load.

In some possible embodiments of the present disclosure, the SSB is an S-SSB, the PSS is an S-PSS, the SSS is an S-SSS, and the PBCH is a PSBCH.

It should be appreciated that, the specific implementation modes in the above-mentioned second to tenth embodiments may also be applied to the embodiments involving the signal transmission device with a same technical effect. The signal transmission device may further include a processing module 62 so as to process information transmitted by the transmission module 61.

As shown in FIG. 7, the present disclosure further provides in some embodiments a UE 70, which includes a processor 72, a receiver 71, a memory 73, and a program stored in the memory 73 and executed by the processor 72. The processor 72 is configured to execute the program, so as to receive an SSB within a synchronization subframe or slot, the SSB including a PSS, an SSS and a PBCH. At least one of the following information is configured through at least one of a preconfigured mode, the PBCH, a DMRS corresponding to the PBCH and the SSS: information about the quantity of SSBs actually received by the UE within a synchronization period, information about a time-domain position of the SSB, and information about an index number of a currently-received SSB. In some possible embodiments of the present disclosure, at least one of the information about the quantity of SSBs actually received by the UE within a synchronization period and the information about the time-domain position of the SSB are configured through the preconfigured mode, and the information about the index number of the currently-received SSB is configured through the DMRS corresponding to the PBCH.

In some possible embodiments of the present disclosure, a maximum quantity of SSBs received by the UE within a synchronization period is determined in accordance with an SCS of the SSB.

In some possible embodiments of the present disclosure, at least one of the information about the quantity of SSBs actually received by the UE and the information about the time-domain position of the SSB is indicated through at least two bits, and the SSBs actually received by the UE within a synchronization period are discontinuous or continuous within the configured synchronization subframe or slot.

In some possible embodiments of the present disclosure, the information about the quantity of SSBs actually received by the UE and/or the information about the time-domain position of the SSB are indicated through at least one bit, and the SSBs actually received by the UE within a synchronization period are continuous within the configured synchronization subframe or slot.

In some possible embodiments of the present disclosure, continuous M synchronization subframes or slots are set every N subframes or slots, the SSB is received within the synchronization subframe or slot, and the continuous M synchronization subframes or slots form a group of synchronization resources, where N≥1 and M≥1; or continuous M synchronization subframes or slots are set every N Sidelink available subframes or slots, the SSB is received within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-received SSB is indicated through at least one bit.

In some possible embodiments of the present disclosure, in the case that PBCH channel estimation is performed through the DMRS, at least one of the information about the quantity of SSBs actually received by the UE within a synchronization period, the information about the time-domain position of the SSB and the information about the index number of the currently-received SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually received by the UE within a synchronization period, the information about the time-domain position of the SSB and the information about the index number of the currently-received SSB is carried by a PBCH load.

In some possible embodiments of the present disclosure, the SSB is an S-SSB, the PSS is an S-PSS, the SSS is an S-SSS, and the PBCH is a PSBCH.

It should be appreciated that, the specific implementation modes in the above-mentioned second to tenth embodiments may also be applied to the embodiments involving the UE with a same technical effect. In the UE, the receiver 71 may be in communication with the memory 73 and the processor 72 via a bus interface, a function of the processor 72 may also be achieved by the receiver 71, and a function of the receiver 71 may also be achieved by the processor 72.

Figure 8:
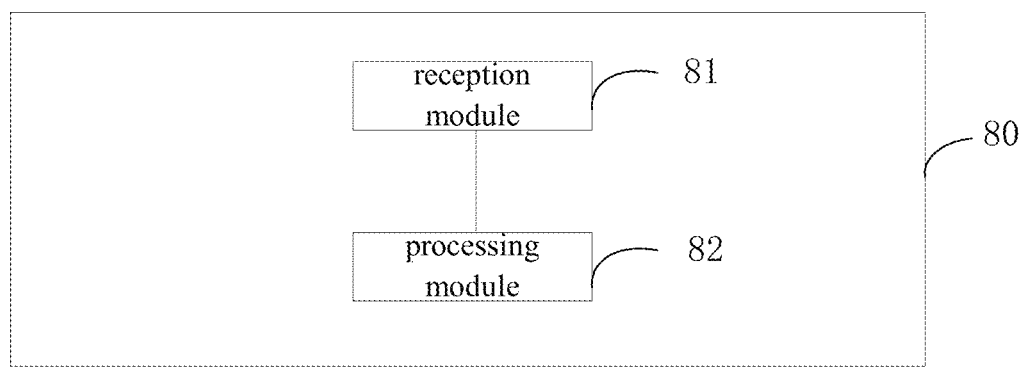
FIG. 8 is a schematic view showing modules of a signal reception device according to one embodiment of the present disclosure.

As shown in FIG. 8, the present disclosure further provides in some embodiments a signal reception device 80, which includes a reception module 81 configured to receive an SSB within a synchronization subframe or slot, the SSB including a PSS, an SSS and a PBCH. At least one of the following information is configured through at least one of a preconfigured mode, the PBCH, a DMRS corresponding to the PBCH and the SSS: information about the quantity of SSBs actually received by the UE within a synchronization period, information about a time-domain position of the SSB, and information about an index number of a currently-received SSB. In some possible embodiments of the present disclosure, at least one of the information about the quantity of SSBs actually received by the UE within a synchronization period and the information about the time-domain position of the SSB are configured through the preconfigured mode, and the information about the index number of the currently-received SSB is configured through the DMRS corresponding to the PBCH.

In some possible embodiments of the present disclosure, a maximum quantity of SSBs received by the UE within a synchronization period is determined in accordance with an SCS of the SSB.

In some possible embodiments of the present disclosure, at least one of the information about the quantity of SSBs actually received by the UE and the information about the time-domain position of the SSB is indicated through at least two bits, and the SSBs actually received by the UE within a synchronization period are discontinuous or continuous within the configured synchronization subframe or slot.

In some possible embodiments of the present disclosure, the information about the quantity of SSBs actually received by the UE and/or the information about the time-domain position of the SSB are indicated through at least one bit, and the SSBs actually received by the UE within a synchronization period are continuous within the configured synchronization subframe or slot.

In some possible embodiments of the present disclosure, continuous M synchronization subframes or slots are set every N subframes or slots, the SSB is received within the synchronization subframe or slot, and the continuous M synchronization subframes or slots form a group of synchronization resources, where N≥1 and M≥1; or continuous M synchronization subframes or slots are set every N Sidelink available subframes or slots, the SSB is received within the synchronization subframe or slot, and the continuous M synchronization subframes or slots form a group of synchronization resources, where N≥1 and M≥1.

In some possible embodiments of the present disclosure, a value of at least one of N and M is determined in accordance with an SCS of the SSB.

In some possible embodiments of the present disclosure, the information about the index number of the currently-received SSB is indicated through at least one bit.

In some possible embodiments of the present disclosure, in the case that PBCH channel estimation is performed through the DMRS, at least one of the information about the quantity of SSBs actually received by the UE within a synchronization period, the information about the time-domain position of the SSB and the information about the index number of the currently-received SSB is carried by at least one of a DMRS sequence and a PBCH load.

In some possible embodiments of the present disclosure, in the case that the PBCH channel estimation is performed merely through the SSS and there is no DMRS, at least one of the information about the quantity of SSBs actually received by the UE within a synchronization period, the information about the time-domain position of the SSB and the information about the index number of the currently-received SSB is carried by a PBCH load.

In some possible embodiments of the present disclosure, the SSB is an S-SSB, the PSS is an S-PSS, the SSS is an S-SSS, and the PBCH is a PSBCH.

It should be appreciated that, the specific implementation modes in the above-mentioned second to tenth embodiments may also be applied to the embodiments involving the signal reception device with a same technical effect. The signal reception device may further include a processing module 82 configured to process information received by the reception module 81.

The present disclosure further provides in some embodiments a computer-readable storage medium including an instruction. The instruction is executed by a processor so as to implement the method as shown in FIG. 2 or FIG. 4.

According to the embodiments of the present disclosure, in the case of beam sweeping or beam repetition, the UE may determine the information about the quantity of SSBs actually transmitted by the UE, the information about the time-domain position of the SSB and the information about the index number of the SSB in accordance with a method used by the UE for performing the PBCH channel estimation, so it is able to broadcast the information with a relatively small PBCH load, thereby to reduce the signaling overhead, and enable the UE to complete a synchronization procedure in accordance with the relevant information about the SSB.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A signal transmission method performed by a User Equipment (UE), comprising:
   transmitting a Synchronization Signal Block (SSB) within a synchronization subframe or slot, the SSB comprising a Primary Synchronization Signal (PSS), a Secondary Synchronization Signal (SSS) and a Physical Broadcast Channel (PBCH),
   wherein following information is carried through at least one of the PBCH, a Demodulated Reference Signal (DMRS) corresponding to the PBCH, or the SSS: information about the quantity of SSBs actually transmitted by the UE within a synchronization period,
   wherein the information about the quantity of SSBs actually transmitted by the UE within the synchronization period is indicated through at least two bits, and the SSBs actually transmitted by the UE within the synchronization period are discontinuous or continuous within the configured synchronization subframe or slot; or
   wherein the information about the quantity of SSBs actually transmitted by the UE within the synchronization period is indicated through at least one bit, and the SSBs actually transmitted by the UE within the synchronization period are continuous within the configured synchronization subframe or slot.

2. The signal transmission method according to claim 1, wherein a maximum quantity of SSBs transmitted by the UE within a synchronization period is determined in accordance with a Sub-Carrier Spacing (SCS) of the SSB.

3. The signal transmission method according to claim 1, wherein continuous M synchronization subframes or slots are set every N subframes or slots, the SSB is transmitted within the synchronization subframe or slot, and the continuous M synchronization subframes or slots form a group of synchronization resources, where $N \geq 1$ and $M \geq 1$; or
   continuous M synchronization subframes or slots are set every N Sidelink available subframes or slots, the SSB is transmitted within the synchronization subframe or slot, and the continuous M synchronization subframes or slots form a group of synchronization resources, where $N \geq 1$ and $M \geq 1$.

4. The signal transmission method according to claim 3, wherein a value of at least one of N and M is determined in accordance with an SCS of the SSB.

5. The signal transmission method according to claim 1, wherein the information about the index number of the currently-transmitted SSB is indicated through at least one bit.

6. The signal transmission method according to claim 1, wherein in the case that PBCH channel estimation is performed through the DMRS, at least one of the information about the quantity of SSBs actually transmitted by the UE within a synchronization period, the information about the time-domain position of the SSB and the information about the index number of the currently-transmitted SSB is carried by at least one of a DMRS sequence and/or a PBCH load; or
   wherein in the case that the PBCH channel estimation is performed merely through the SSS and there is no DMRS, at least one of the information about the quantity of SSBs actually transmitted by the UE within a synchronization period, the information about the time-domain position of the SSB and the information about the index number of the currently-transmitted SSB is carried by a PBCH load.

7. The signal transmission method according to claim 1, wherein the SSB is a Sideline-SSB (S-SSB), the PSS is a Sidelink-PSS (S-PSS), the SSS is a Sidelink-SSS (S-SSS), and the PBCH is a Physical Sidelink Broadcast Channel (PSBCH).

8. A signal reception method performed by a User Equipment (UE), comprising:
   receiving a Synchronization Signal Block (SSB) within a synchronization subframe or slot, the SSB comprising a Primary Synchronization Signal (PSS), a Secondary Synchronization Signal (SSS) and a Physical Broadcast Channel (PBCH),
   wherein following information is carried through at least one of the PBCH, a Demodulated Reference Signal (DMRS) corresponding to the PBCH, or the SSS: information about the quantity of SSBs actually received by the UE within a synchronization period,
   wherein the information about the quantity of SSBs actually transmitted by the UE within the synchronization period is indicated through at least two bits, and the SSBs actually transmitted by the UE within the synchronization period are discontinuous or continuous within the configured synchronization subframe or slot; or
   wherein the information about the quantity of SSBs actually transmitted by the UE within the synchronization period is indicated through at least one bit, and the SSBs actually transmitted by the UE within the synchronization period are continuous within the configured synchronization subframe or slot.

9. The signal reception method according to claim 8, wherein a maximum quantity of SSBs received by the UE within a synchronization period is determined in accordance with a Sub-Carrier Spacing (SCS) of the SSB.

10. The signal reception method according to claim 8, wherein the information about the index number of the currently-received SSB is indicated through at least one bit.

11. The signal reception method according to claim 8, wherein continuous M synchronization subframes or slots are set every N subframes or slots, the SSB is received within the synchronization subframe or slot, and the continuous M synchronization subframes or slots form a group of synchronization resources, where N≥1 and M≥1; or continuous M synchronization subframes or slots are set every N Sidelink available subframes or slots, the SSB is received within the synchronization subframe or slot, and the continuous M synchronization subframes or slots form a group of synchronization resources, where N≥1 and M≥1.

12. The signal reception method according to claim 11, wherein a value of at least one of N and M is determined in accordance with an SCS of the SSB.

13. The signal reception method according to claim 8, wherein in the case that PBCH channel estimation is performed through the DMRS, at least one of the information about the quantity of SSBs actually received by the UE within a synchronization period, the information about the time-domain position of the SSB and the information about the index number of the currently-received SSB is carried by at least one of a DMRS sequence and/or a PBCH load; or wherein in the case that the PBCH channel estimation is performed merely through the SSS and there is no DMRS, at least one of the information about the quantity of SSBs actually received by the UE within a synchronization period, the information about the time-domain position of the SSB and the information about the index number of the currently-received SSB is carried by a PBCH load.

14. The signal reception method according to claim 8, wherein the SSB is a Sideline-SSB (S-SSB), the PSS is a Sidelink-PSS (S-PSS), the SSS is a Sidelink-SSS (S-SSS), and the PBCH is a Physical Sidelink Broadcast Channel (PSBCH).

15. A User Equipment (UE), comprising a processor, a transmitter, a memory, and a program stored in the memory and executed by the processor, wherein the processor is configured to execute the program, so as to transmit a Synchronization Signal Block (SSB) within a synchronization subframe or slot, the SSB comprises a Primary Synchronization Signal (PSS), a Secondary Synchronization Signal (SSS) and a Physical Broadcast Channel (PBCH), and following information is carried through at least one of the PBCH, a Demodulated Reference Signal (DMRS) corresponding to the PBCH, or the SSS: information about the quantity of SSBs actually transmitted by the UE within a synchronization period, wherein the information about the quantity of SSBs actually transmitted by the UE within the synchronization period is indicated through at least two bits, and the SSBs actually transmitted by the UE within the synchronization period are discontinuous or continuous within the configured synchronization subframe or slot; or wherein the information about the quantity of SSBs actually transmitted by the UE within the synchronization period is indicated through at least one bit, and the SSBs actually transmitted by the UE within the synchronization period are continuous within the configured synchronization subframe or slot.

16. The UE according to claim 15, wherein a maximum quantity of SSBs transmitted by the UE within a synchronization period is determined in accordance with a Sub-Carrier Spacing (SCS) of the SSB.

17. The UE according to claim 15, wherein the SSB is a Sideline-SSB (S-SSB), the PSS is a Sidelink-PSS (S-PSS), the SSS is a Sidelink-SSS (S-SSS), and the PBCH is a Physical Sidelink Broadcast Channel (PSBCH).

18. A User Equipment (UE), comprising a processor, a receiver, a memory, and a program stored in the memory and executed by the processor, wherein the processor is configured to execute the program, so as to realize the signal reception method performed by the UE according to claim 8.

* * * * *